United States Patent [19]

Ogilvie et al.

[11] Patent Number: 4,674,923
[45] Date of Patent: Jun. 23, 1987

[54] ACCESS NOTCHES FOR INDEXING INSERTS IN A GROOVE MILL

[75] Inventors: Francis J. Ogilvie, Mount Zion; Nathan J. Harshman, Sullivan, both of Ill.

[73] Assignee: Ratemaker Tools, Inc., Mount Zion, Ill.

[21] Appl. No.: 764,064

[22] Filed: Aug. 9, 1985

[51] Int. Cl.⁴ .............................................. B26D 1/00
[52] U.S. Cl. ........................................ 407/31; 407/44; 407/48; 407/52; 407/58; 409/213; 409/217; 144/237
[58] Field of Search ...................... 407/48, 47, 52, 53, 407/58, 31, 34, 47, 40, 51, 44; 144/136 R, 90, 236, 237, 218–220, 230, 235, 90 A; 83/875; 409/232, 234, 236, 213, 217

[56] References Cited

U.S. PATENT DOCUMENTS

| 205,296 | 6/1878 | Peer | 407/31 |
| 486,269 | 11/1892 | Zimmermann | 144/236 |
| 656,027 | 8/1900 | Kuebler | 407/52 |
| 1,714,700 | 5/1929 | Stull | 407/52 |

FOREIGN PATENT DOCUMENTS

| 1115038 | 12/1981 | Canada | 144/90 A |
| 1254578 | 11/1971 | United Kingdom | 407/58 |

Primary Examiner—Leonidas Vlachos
Attorney, Agent, or Firm—Harvey B. Jacobson

[57] ABSTRACT

A tool for use in a groove mill to simultaneously form spaced grooves in the interior surface of a bore with the tool including a shank and a pair of heads mounted thereon in spaced relation and in a detachable, non-rotative manner. Each head includes a plurality of insert pockets and inserts secured therein by screw threaded retainers and notches in one head aligned with the screw headed retainers for the inserts in the opposite head to enable indexing of the inserts without disassembly of the heads.

6 Claims, 4 Drawing Figures

ACCESS NOTCHES FOR INDEXING INSERTS IN A GROOVE MILL

BACKGROUND OF THE INVENTION

1. Field of the Invention

The present invention relates to a tool for use in a groove mill and more specifically to a tool insert mounting to provide an indexable insert arrangement for axially spaced and circumferentially staggered inserts for more effectively milling grooves for snap rings, O-rings and the like in the interior surface of a bore.

2. Description of the Prior Art

In present day practice, a groove or grooves are formed in the interior of a bore by the use of a single point recessing tool or a small saw mounted on an arbor. These arrangements and procedures are relatively slow and inefficient in operation and are subject to inaccuracies since the tool or saw may be subject to deflection when forced into engagement with the workpiece.

SUMMARY OF THE INVENTION

An object of the present invention is to provide a tool with indexable inserts for use in a double groove mill for milling grooves in the interior surface of a bore for snap rings, O-rings and the like including axially spaced heads mounted on the end of the tool shank with each of the heads having pockets receiving screw mounted indexable inserts in the spaced opposed faces thereof which are arranged in circumferentially staggered relation with each head also including notches providing access to the insert mounting screws which mount the inserts on the opposite head thereby enabling indexing of the inserts without disassembly of the heads from the shank since the mounting screws for the indexable inserts are accessible through the notches in the opposite head.

Another object of the invention is to provide a tool in accordance with the preceding object capable of simultaneously cutting two grooves at relatively high speeds using carbide inserts in which the indexable inserts are secured by mounting screws accessible through notches in the heads mounted on the tool shank so that the inserts can be indexed without disassembly of the heads from the shank.

A further object of the invention is to provide a tool in accordance with the preceding objects wherein the widths of the grooves to be cut in the inside surface of a bore can be the same or different depending upon the insert, mounted on the spaced heads which are spaced apart by a spacer which can be varied in width by interchange with other spacers.

Still another object of the invention is to provide a tool in accordance with the preceding objects in which staggered cuts are smoother and more accurate inasmuch as one insert edge is always in the cut since the inserts are staggered circumferentially thereby providing a very stable insert arrangement to produce an accurate and smooth groove or grooves.

A further object of the invention is to provide a tool capable of cutting different width grooves by staging the inserts axially by forming the insert pockets or recesses successively deeper.

Yet another important object of the invention is to provide a tool for a double groove mill with axially spaced circular heads having pockets or recesses in the facing surfaces thereof for screw mounted indexable inserts with each head including peripherally spaced access notches extending axially therethrough to provide access to the mounting screw of the indexable insert on the opposite head which is relatively simple in construction, dependable and long lasting and provides advantages of efficiency and reduction in time required to form grooves in the interior surface of a bore.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
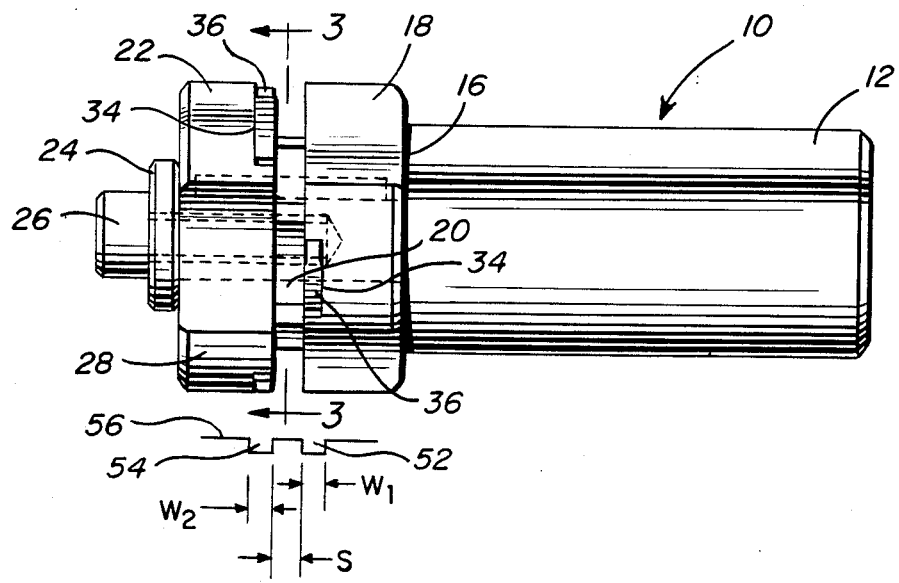
FIG. 1 is a side elevational view of the tool of the present invention.

Referring now specifically to the drawings, the tool of the present invention is generally designated by the numeral 10 and includes a generally cylindrical shank 12 for interchangeable and rigid supporting engagement in a collet chuck of a double groove mill. The outer end of the shank 12 is provided with a reduced diameter arbor 14 thus defining a shoulder 16 at the juncture between the arbor and the shank 12 with the interior of the arbor being tubular and internally screw threaded and the exterior thereof having a longitudinal groove for receiving key 17 to rotatable lock an inner replaceable head 18, a spacer 20 and an outer replaceable head 22 on the arbor with these components being secured fixedly but interchangeably in place by a retaining washer 24 and a retaining screw 26 which may be in the form of a cap screw or the like that is screw threadedly engaged into the internally threaded bore on the arbor 14 which enables interchange or replacement of the heads 18 and 22 and the spacer 20.

Figure 2:
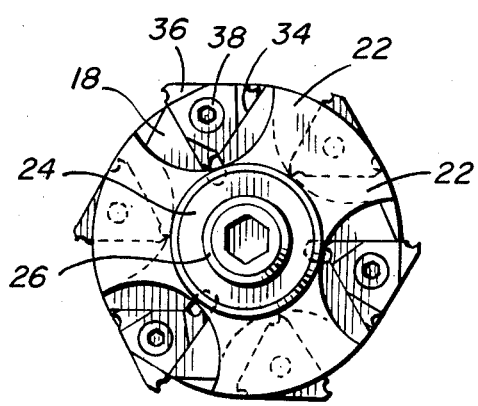
FIG. 2 is an end elevational view of the tool of FIG. 1.
Figure 3:
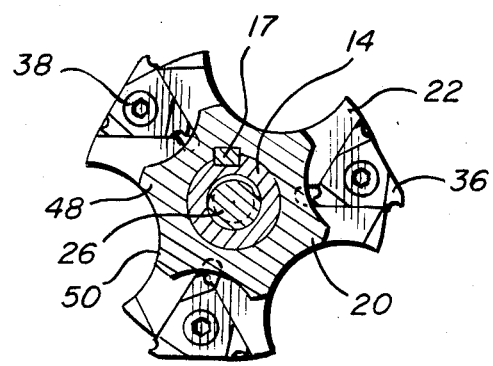
FIG. 3 is a transverse, sectional view taken substantially upon a plane passing along section line 3—3 on FIG. 1 illustrating the structural details of one of the heads on the tool.
Figure 4:
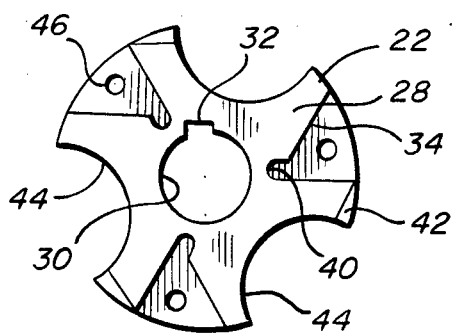
FIG. 4 is an end elevational view of one of the heads illustrating the pockets for the indexable inserts.

Each of the heads 18 and 22 are substantially identical and include a generally cylindrical body 28 having a central bore 30 therein for engagement on the arbor 14 with a longitudinal groove 32 being formed therein to engage a portion of the longitudinal key 17. FIG. 4 illustrates the outer head 22 with the inwardly facing surface thereof including three equally spaced pockets 34 for receiving triangular indexable inserts 36 which are secured in indexed position by a retaining screw 38. The shape of the pockets 34 is substantially the same as the shape of the inserts 36 with one edge of the pocket lying along the radius of the body 28 so that one edge of the insert 36 will lie along the radius of the body 28 with the other edge of the pocket 34 and insert 36 being oriented in angular relation thereto. The inner apex of the pocket 34 is provided with a relief area 40 and the peripheral portion of the body 28 joining with the radial edge of the pocket 34 is relieved at 42 to enable discharge of chips. In between the pockets 34 and equally circumferentially spaced around the body 28 are three generally semi-cylindrical notches 44 which have an inner peripheral edge generally aligned with the inner tip of an insert 36 on the opposite head as illustrated in FIG. 2. Also, each pocket 34 includes an internally threaded hole 46 receiving the insert mounting screw 38. The spacer 20 is also in the form of a cylindrical body 48 having arcuate notches 50 spaced equally about the periphery thereof with the spacer including six notches to align respectively with the inner portions of the notches 44 in the heads 18 and 22 which are staggered in relation to each other so that the inserts 36 mounted on the head 18 are in staggered relation to the inserts 36 mounted on the head 22. Thus, the six notches 50 in the spacer enable a tool such as a wrench or other tool having a tool engaging element corresponding with the socket in the head of the insert screw 38 may be inserted through a notch 44 in one of the heads 18 or 22 and through a corresponding aligned notch 50 in the spacer 20 and thus engage the insert screw 38 for an insert 36 mounted on the opposite head in order for that insert to be indexed without disassembly of the heads from the shank. Thus, all of the inserts 36 may be indexed or changed or replaced without disassembly of the heads.

As illustrated in FIG. 1, the tool of the present invention is capable of simultaneously milling grooves 52 and 54 in the interior surface of a bore 56 with the width W1 and W2 of the groove and the width of the spacer S being varied by interchange of heads, inserts and spacers. Also, because of the staggered relationship of the inserts on the tool heads 18 and 22, one of the inserts will always be in a groove being cut thereby providing greater stability to the cutting inserts for more accuracy and also providing a smoother surface on the grooves by virtue of the stability provided by one of the inserts always being engaged in the cut. The widths W1 and W2 can be wider than the insert thickness by staging the inserts axially by making the insert pockets successively deeper.

The tool of this invention enables simultaneous cutting of two grooves using indexable screw-on inserts which can be indexed without disassembly of the heads from the shank by provision of the access notches in the heads and spacer. The staggered arrangement of the inserts provides staggered cuts which are more smooth and accurate because one cutting edge is always in the cut thereby providing a very stable arrangement. The use of carbide inserts enables high speeds to be accomplished for efficiently milling grooves such as those adapted to receive snap rings, O-rings and the like in the inside of a bore with the operation using the present invention being substantially faster than the use of a single point recessing tool or a small saw mounted on an arbor which arrangements are presently being employed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A tool for simultaneously cutting two grooves in axially spaced relation in the interior surface of a bore comprising a shank adapted to be received in the chuck of a groove mill, a pair of heads mounted on the shank by a removable fastening means, a spacer between the heads to retain them in axially spaced relation on the shank, the adjacent opposed faces of the heads including a plurality of circumferentially, evenly spaced pockets, an indexable insert removably and indexably mounted in each pocket and projecting beyond the periphery of the heads for cutting axially spaced grooves in the interior surface of a bore, said pockets and inserts therein on one head being in circumferentially staggered relation to the pockets and inserts therein on the other head, each of said heads including circumferentially, evenly spaced access notches with the access notches in one head being aligned with the pockets and inserts therein in the opposite head to enable access to the inserts and retaining means therefor to enable the inserts to be indexed without disassembly of the heads from the shank, said shank including a reduced diameter arbor defining a shoulder limiting the inward movement of an inner head onto the shank, the fastening means for the heads including a screw threaded member and washer thereon engaging the outer surface of the outer head and screw threaded into an internally threaded bore in the arbor for securing the heads in place on the arbor, said heads and spacer being keyed to the arbor to prevent relative rotation therebetween, said spacer having notches therein in registry with the notches in both of the heads to provide stable support for that portion of the heads between the notches, the staggered relationship of the insert in adjacent heads maintaining the cutting tip of one of the cutting inserts in a groove being cut at all times, thereby stabilizing the heads and inserts for producing accurate grooves having smooth surfaces.

2. A tool for simultaneously cutting two grooves in axially spaced relation in the interior surface of a bore comprising a shank adapted to be received in the chuck of a groove mill, a pair of heads mounted on the shank by a removable fastening means, a spacer between the heads to retain them in axially spaced relation on the shank, the adjacent opposed faces of the heads including a plurality of circumferentially, evenly spaced pockets, an indexable insert removably and indexably mounted in each pocket and projecting beyond the periphery of the heads for cutting axially spaced grooves in the interior surface of a bore, said pockets and inserts therein on one head being in circumferentially staggered relation to the pockets and inserts therein on the other head, each of said heads including circumferentially, evenly spaced access notches with the access notches in one head being aligned with the pockets and inserts therein in the opposite head to enable access to the inserts and retaining means therefor to enable the inserts to be indexed without disassembly of the heads from the shank, said inner pockets being of generally triangular configuration and the inserts are triangular for positioning therein, said pockets being successively axially deeper to enable staggering of the inserts to enable the width of the grooves being cut by the inserts to be varied and wider than the width of a single insert.

3. The tool as defined in claim 2 wherein each head includes three pockets and three inserts and three access notches with the spacer including six access notches, the outer perimeter of the spacer being greater than a circle passing through the inner apexes of the pockets to stablize the heads.

4. A tool for simultaneously cutting two generally parallel grooves in axially spaced relation in a surface comprising a shank adapted to be received in the chuck of a groove mill, a pair of heads mounted on the shank, a spacer between the heads to retain them in axially spaced relation on the shank, the adjacent opposed faces of the heads including a plurality of circumferentially, evenly spaced pockets, an indexable insert removably and indexably mounted in each pocket and projecting beyond the periphery of the heads for cutting axially spaced grooves in the surface, each insert being retained in its pocket by retaining means, said pockets and inserts therein on one head being in circumferentially staggered relation to the pockets and inserts therein on the other head, each of said heads including circumferentially, evenly spaced access notches with the access notches in one head being aligned with the pockets and inserts therein in the opposite head to enable access to the insert retaining means to enable the inserts to be indexed without disassembly of the heads from the shank, said heads and spacer being keyed to the shank to prevent relative rotation therebetween, said spacer having recesses therein in registry with the notches in both of the heads with the periphery of the spacer extending radially beyond the inner edges of the notches in the heads to provide stable support for that portion of the heads between the notches.

5. A tool for simultaneously cutting two generally parallel grooves in axially spaced relation in a surface comprising a shank adapted to be received in the chuck of a groove mill, a pair of heads mounted on the shank, a spacer between the heads to retain them in axially spaced relation on the shank, the adjacent opposed faces of the heads including a plurality of circumferentially, evenly spaced pockets, an indexable insert removably and indexably mounted in each pocket and projecting beyond the periphery of the heads for cutting axially spaced grooves in the surface, each insert being retained in its pocket by retaining means, said pockets and inserts therein on one head being in circumferentially staggered relation to the pockets and inserts therein on the other head, each of said heads including circumferentially, evenly spaced access notches with the access notches in one head being aligned with the pockets and inserts therein in the opposite head to enable access to the insert retaining means to enable the inserts to be indexed without disassembly of the heads from the shank, the spacer including a number of notches equal to the total number of pockets or inserts in both the heads, the outer perimeter of the spacer being greater than a circle passing through the inner apexes of the pockets to stabilize the heads.

6. The tool as defined in claim 5 wherin said insert pockets are of generally polygonal configuration and the inserts are polygonal for positioning therein, said pockets being successively axially deeper to enable staggering of the inserts to enable the width of the grooves being cut by the inserts to be varied and wider than the width of a single insert, the inserts on said heads being staggered for maintaining a tip of an insert in a groove being cut at all times.

* * * * *